(12) United States Patent
Yang et al.

(10) Patent No.: US 11,160,128 B2
(45) Date of Patent: Oct. 26, 2021

(54) METHOD FOR PERFORMING MEASUREMENT AND TERMINAL FOR PERFORMING MEASUREMENT

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/634,870

(22) PCT Filed: Aug. 3, 2018

(86) PCT No.: PCT/KR2018/008829
§ 371 (c)(1),
(2) Date: Jan. 28, 2020

(87) PCT Pub. No.: WO2019/031768
PCT Pub. Date: Feb. 14, 2019

(65) Prior Publication Data
US 2020/0170062 A1 May 28, 2020

Related U.S. Application Data

(60) Provisional application No. 62/542,298, filed on Aug. 8, 2017, provisional application No. 62/542,300, filed on Aug. 8, 2017.

(51) Int. Cl.
*H04W 76/16* (2018.01)
*H04W 76/27* (2018.01)
(Continued)

(52) U.S. Cl.
CPC ......... *H04W 76/16* (2018.02); *H04W 56/001* (2013.01); *H04W 76/27* (2018.02); *H04W 88/06* (2013.01)

(58) Field of Classification Search
CPC ... H04W 76/16; H04W 76/27; H04W 56/001; H04W 88/06; H04W 56/0015
See application file for complete search history.

(56) References Cited

U.S. PATENT DOCUMENTS

2013/0301619 A1* 11/2013 Singh ............... H04W 56/0045
370/336
2015/0092766 A1* 4/2015 Jean ..................... G01S 19/215
370/350
(Continued)

FOREIGN PATENT DOCUMENTS

KR 20170020488 2/2017
WO 2017034604 3/2017

OTHER PUBLICATIONS

PCT International Application No. PCT/KR2018/008829, International Search Report dated Oct. 8, 2018, 2 pages.
(Continued)

*Primary Examiner* — Mohammad S Anwar
(74) *Attorney, Agent, or Firm* — Lee, Hong, Degerman, Kang & Waimey

(57) ABSTRACT

A disclosure of the present specification provides a method for performing measurement by a terminal which can establish dual connectivity to a first network system and a second network. The method may comprise the steps of: receiving, from a first cell of the first network system, first information relating to a synchronization signal block for a connection to a second cell of a second network system; measuring a time difference between a timing of the first cell and a timing of the second cell; transmitting information on the time difference to the first cell; receiving, from the first cell, second
(Continued)

information updated for the synchronization signal block of the first information; and re-configuring a measurement gap for receiving the synchronization signal block on the basis of the second information.

12 Claims, 19 Drawing Sheets

(51) Int. Cl.
   *H04W 56/00* (2009.01)
   *H04W 88/06* (2009.01)

(56) References Cited

U.S. PATENT DOCUMENTS

2015/0358105 A1* 12/2015 Jung ............... H04L 1/0001
                                                             370/329
2016/0345316 A1   11/2016 Kazmi et al.
2017/0331670 A1*  11/2017 Parkvall ............ H04J 11/0056

OTHER PUBLICATIONS

ZTE et al., "Discussion on NR-LTE Co-existence," 3GPP TSG RAN WG1 Meeting#88, R1-1701618, Feb. 6, 2017, Athens, Greece, 13 pages.

Catt, "NR Mobility Enhancement on Dual Connectivity," 3GPP TSG-RAN WG2 Meeting#97, R2-1700987, Feb. 4, 2017, Athens, Greece, 5 pages.

CMCC, "Discussion on synchronization between MeNB and SeNB of dual connectivity," 3GPP TSG-RAN WG4 Meeting#70bis, R4-141864, Apr. 9, 2014, San Jose Del Cabo, Mexico, 4 pages.

European Patent Office Application Serial No. 18843920.2, Search Report dated Apr. 9, 2021, 5 pages.

* cited by examiner

METHOD FOR PERFORMING MEASUREMENT AND TERMINAL FOR PERFORMING MEASUREMENT

CROSS-REFERENCE TO RELATED APPLICATIONS

This application is the National Stage filing under 35 U.S.C. 371 of International Application No. PCT/KR2018/008829, filed on Aug. 3, 2018, which claims the benefit of U.S. Provisional Application No. 62/542,298, filed on Aug. 8, 2017, and 62/542,300, filed on Aug. 8, 2017, the contents of which are all hereby incorporated by reference herein in their entirety.

BACKGROUND OF THE DISCLOSURE

Field of the Disclosure

The present disclosure relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |

TABLE 1-continued

| REFERENCE POINT | DESCRIPTION |
| --- | --- |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an explanatory diagram showing an expected strucuter of a next-generation mobile communication in a node viewpoint.

As may be seen with reference to FIG. 2, a UE is connected to a data network (DN) over a next-generation radio access network (RAN).

An illustrated control plane function (CPF) node performs some of or all the functions of the mobile management entity (MME) and some of or all the control plane functions of the serving gateway (S-GW) and PDN gateway (P-GW) of fourth-generation mobile communication. The CPF node includes an access and mobility management function (AMF) and a session management function (SMF).

An illustrated user plane function (UPF) node is a kind of gateway through which the data of a user is transmitted and received. The UPF node may perform some of or all the user plane functions of the S-GW and P-GW of fourth-generation mobile communication.

An illustrated policy control function (PCF) is a node controlling the policy of a provider.

An illustrated application function (AF) is a server for providing various services to a UE.

Illustrated integrated unified data management (UDM) is a kind of server managing subscriber information, like the home subscriber server (HSS) of fourth-generation mobile communication. The UDM stores and manages the subscriber information in a unified data repository (UDR).

An illustrated authentication server function (AUSF) authenticates and manages a UE.

An illustrated network slice selection function (NSSF) is a node for network slicing, such as that described later.

Meanwhile, there are two methods of processing a signaling request from a UE in the situation in which the UE has roamed a visit network, for example, a V-PLMN. In a local break out (LBO) method, that is, the first method, a signaling request from the UE is processed in the visit network. According to a home routing (HR) method, that is, the second method, the visit network forwards a signaling request from the UE to the home network of the UE.

FIG. 3 is an exemplary diagram showing the architecture of a common E-UTRAN and a common EPC.

As shown in FIG. 3, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control.

The EPC can perform functions, such as the generation of paging, the management of an LTE IDLE state, the ciphering of a user plane, control of an EPS bearer, the ciphering of NAS signaling, and integrity protection.

FIG. 4 is an exemplary diagram showing the structure of a radio interface protocol in a control plane between UE and an eNodeB, and FIG. 5 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 4 and the radio protocol in the user plane of FIG. 5 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 4 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 4, the RRC layer, the RLC layer, the MAC layer, and the PHY layer placed under the NAS layer are also collectively called an Access Stratum (AS).

FIG. 6a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6b illustrates a connection process in a radio resource control (RRC) layer.

FIG. 6b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, when a UE supports dual connectivity (DC), a master eNodeB (MeNB) may not know a timing difference between the MeNB and a secondary eNodeB (SeNB) before a UE reports a system frame number (SFN) and a subframe timing difference (SSTD) to the MeNB. In this case, there is a problem that the UE cannot set a measurement gap offset (MGO) and a synchronization signal burst set timing offset (SSBO) and thus cannot detect a synchronization signal for accessing other cells.

SUMMARY OF THE DISCLOSURE

To accomplish the aforementioned objects, one aspect of the present description discloses a method for performing measurement by a UE supporting dual connectivity for a first network system and a second network system. The method may include: receiving first information about a synchronization signal block for accessing a second cell of the second network system from a first cell of the first network system; measuring a time difference between a timing of the first cell and a timing of the second cell; transmitting information about the time difference to the first cell; receiving, from the first cell, second information updated with respect to the synchronization signal block of the first information, the second information being generated using the information about the time difference and the first information; and resetting a measurement gap for receiving the synchronization signal block on the basis of the second information.

The first information and the second information may include information about offsets of the synchronization signal block, and the offset of the synchronization signal block included in the second information may be generated by adding the offset of the synchronization signal block included in the first information to the time difference.

The measurement gap may overlap with the synchronization signal block.

The length of the measurement gap may be longer than 6 ms after the information about the time difference is transmitted to the first cell.

When a plurality of synchronization signal blocks is configured for the UE, the length of the measurement gap may be the same as a period of a synchronization signal block having a longest period from among the plurality of synchronization signal block.

The first network system may be LTE (Long Term Evolution) and the second network system may be NR (New Radio access technology).

To accomplish the aforementioned objects, another aspect of the present description discloses a UE performing measurement. The UE may include: a transceiver for receiving first information about a synchronization signal block for accessing a second cell of a second network system from a first cell of a first network system; and a processor for controlling the transceiver, wherein the processor is configured: to measure a time difference between a timing of the first cell and a timing of the second cell; to transmit information about the time difference to the first cell; to receive, from the first cell, second information updated with respect to the synchronization signal block of the first information; and to reset a measurement gap for receiving the synchronization signal block on the basis of the second information, wherein the second information is generated using the information about the time difference and the first information.

According to one aspect of the present description, it is possible to provide a method of setting a measurement gap when a UE supports dual connectivity (DC) between LTE and NR to efficiently detect a synchronization signal of an SeNB.

DESCRIPTION OF EXEMPLARY EMBODIMENTS

Figure 1:
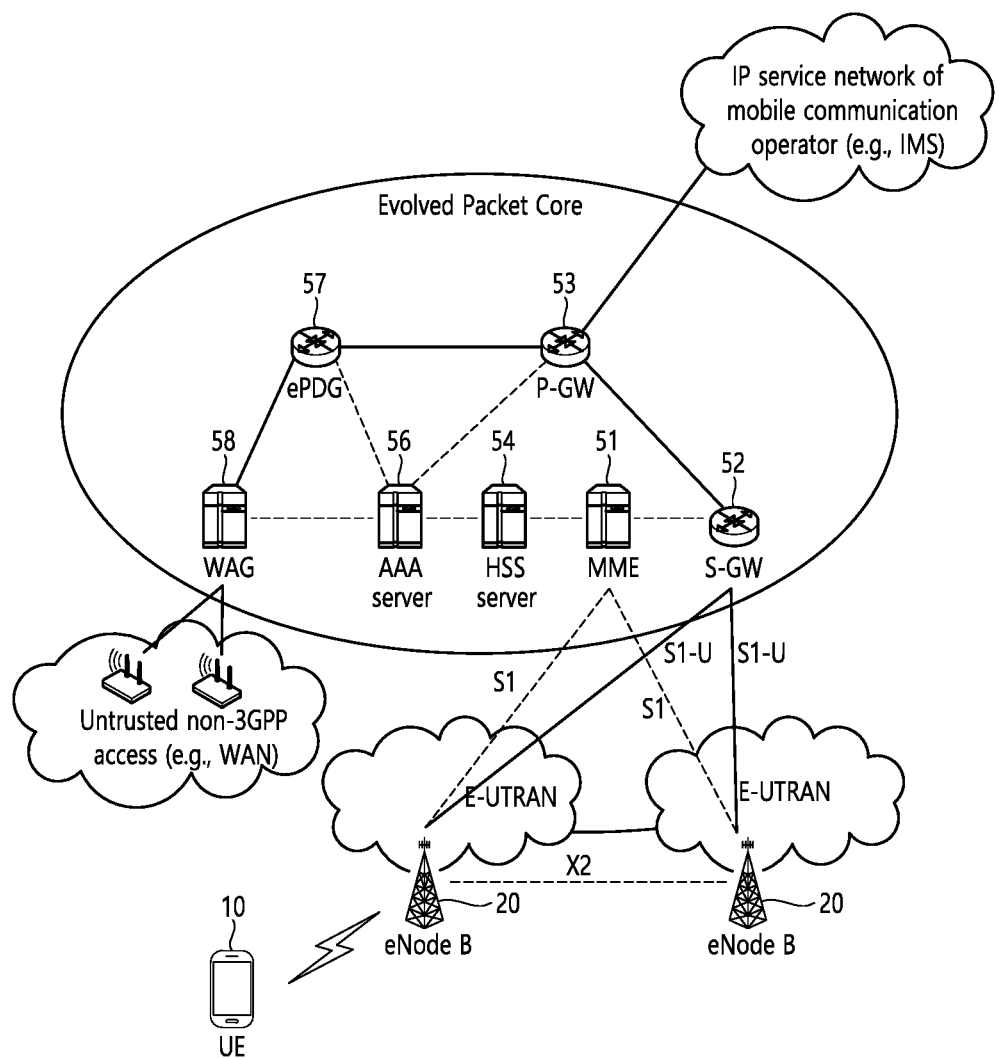
FIG. 1 is a structural diagram of an evolved mobile communication network.
Figure 2:
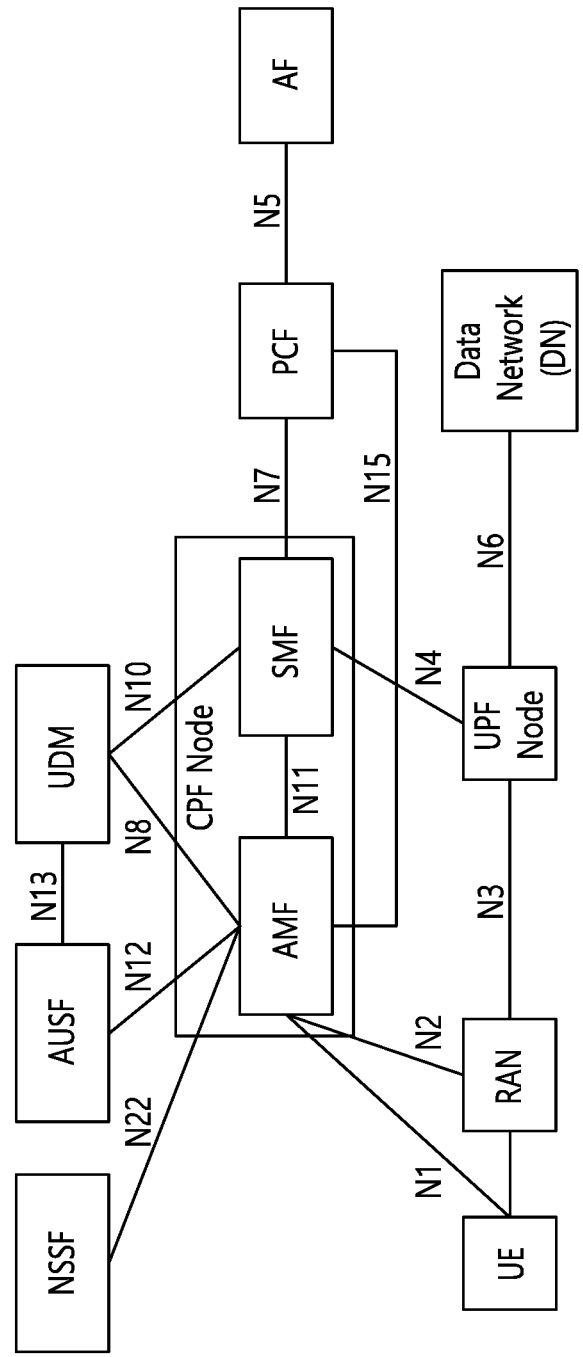
FIG. 2 illustrates an expected structure of the next-generation mobile communication from the viewpoint of a node.
Figure 3:
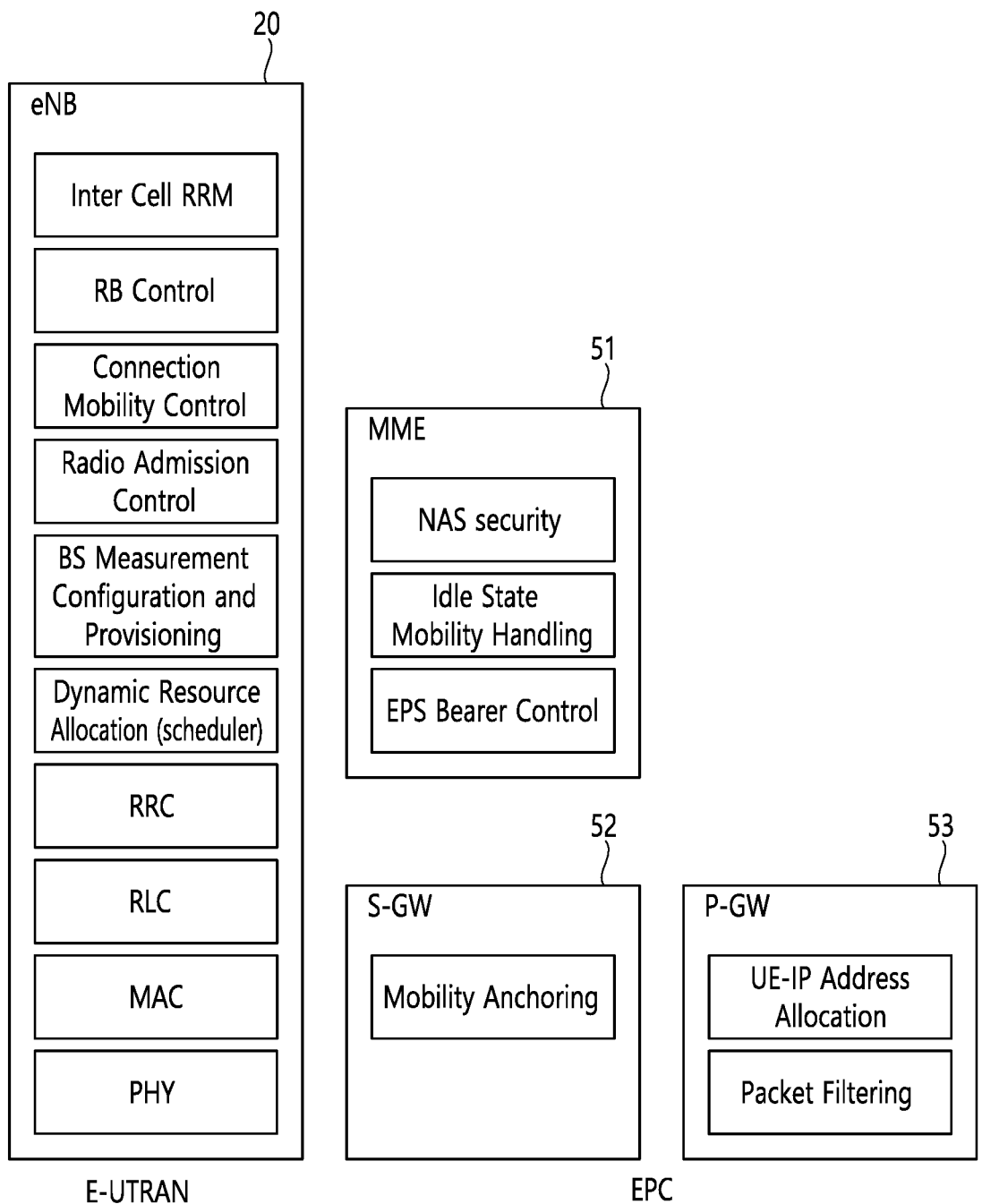
FIG. 3 is an exemplary diagram illustrating architectures of a general E-UTRAN and a general EPC.
Figure 4:
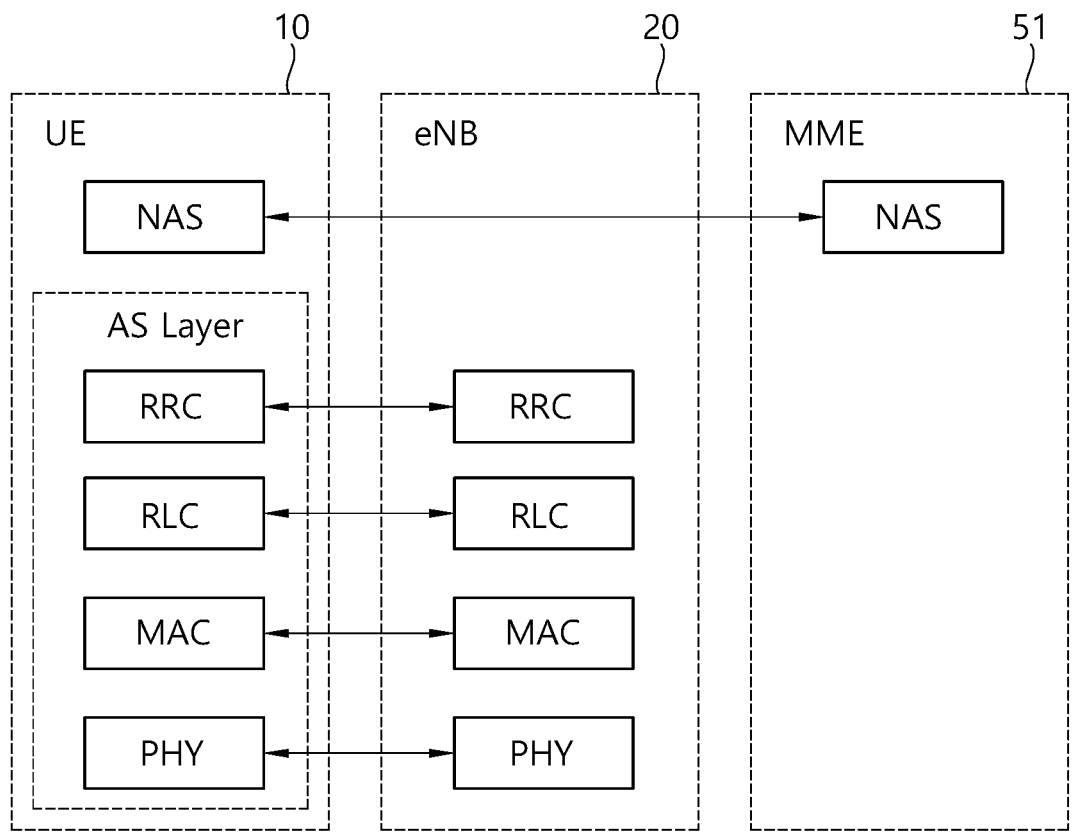
FIG. 4 is an exemplary diagram illustrating a structure of a radio interface protocol on a control plane between UE and eNodeB.
Figure 5:
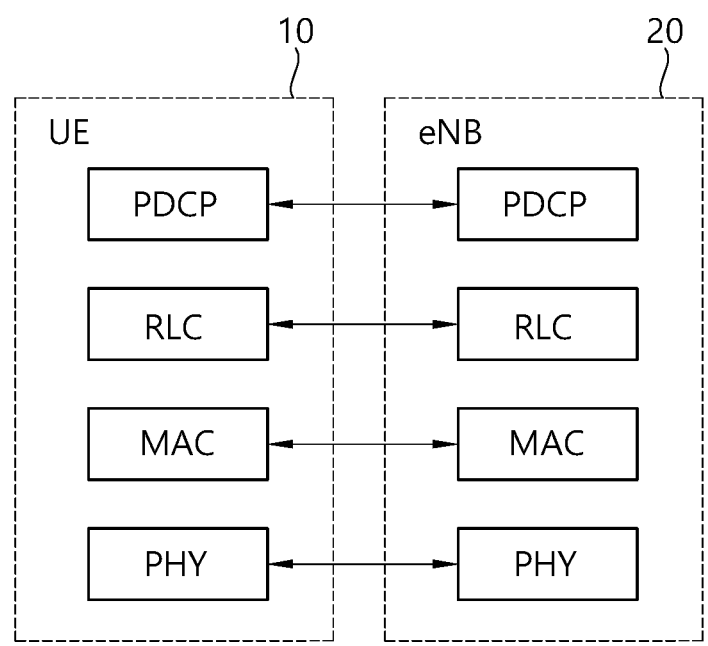
FIG. 5 is another exemplary diagram illustrating a structure of a radio interface protocol on a user plane between the UE and a base station.
Figure 6A:
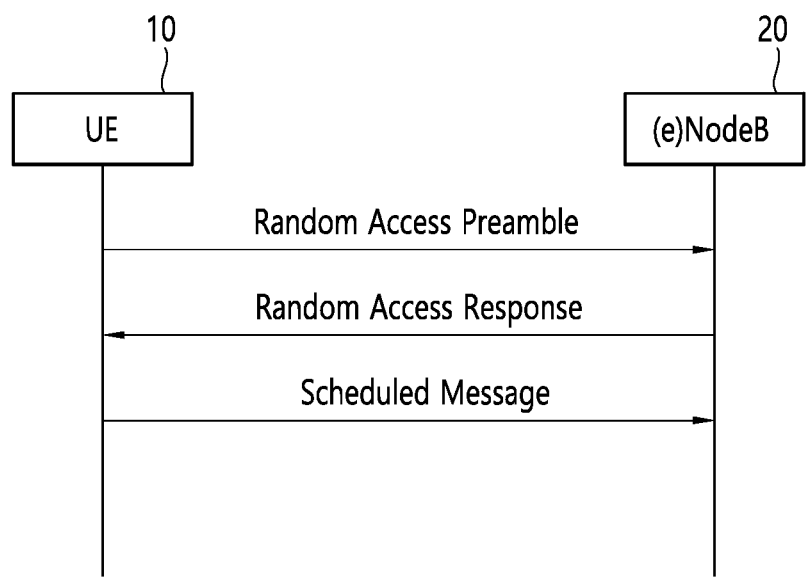
FIG. 6a is a flowchart illustrating a random access process in 3GPP LTE.
Figure 6B:
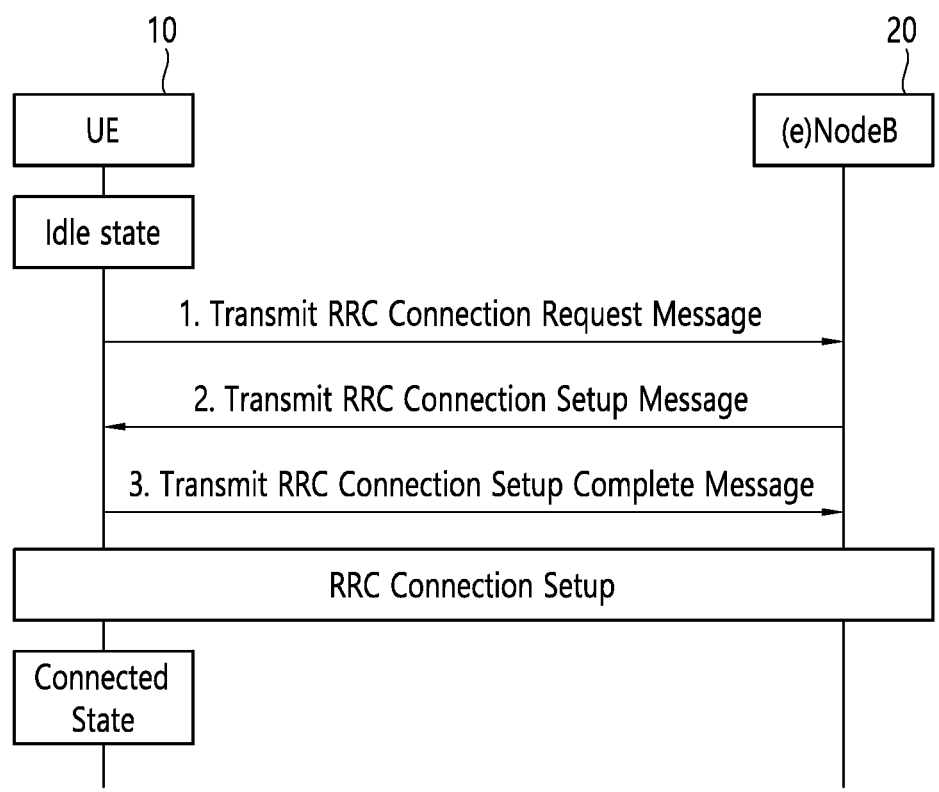
FIG. 6b illustrates a connection process in a radio resource control (RRC) layer.

The present disclosure is described in light of UMTS (Universal Mobile Telecommunication System) and EPC (Evolved Packet Core), but not limited to such communication systems, and may be rather applicable to all communication systems and methods to which the technical spirit of the present disclosure may apply.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the disclosure with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

A Policy and Charging Rule Function (PCRF): The node of an EPS network which performs a policy decision for dynamically applying QoS and a billing policy that are different for each service flow.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

A Tunnel Endpoint Identifier (TEID): The end point ID of a tunnel set between nodes within a network, and it is set for each bearer unit of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

Mobility management (MM) operation/procedure: an operation or procedure for the mobility control/management/control of a UE. The MM operation/procedure may be construed as including one or more of an MM operation/procedure in a CS network, a GMM operation/procedure in a GPRS network, or an EMM operation/procedure in an EPS network. A UE and a network node (MME, SGSN, MSC) exchange MM messages in order to perform an MM operation/procedure.

Session management (SM) operation/procedure: an operation or procedure for controlling/managing/processing/handling the user plane and/or bearer context/PDP context of a UE. The SM operation/procedure may be construed as including one or more of an SM operation/procedure in a GPRS network or an ESM operation/procedure in an EPS network. A UE and a network node (MME, SGSN) exchange SM message in order to perform an SM operation/procedure.

Low priority UE: a UE set with NAS signal low priority. For detailed contents, reference may be made to the standard document 3GPP TS 24.301 and TS 24.008.

Normal priority UE: a normal UE not set with low priority

Dual priority UE: a UE set with dual priority. This UE is a UE set with NAS signal low priority and also configured to override the set NAS signal low priority (i.e., UE which provides dual priority support is set for NAS signalling low priority and also set to override the NAS signalling low priority indicator). For detailed contents, reference may be made to the standard document 3GPP TS 24.301 and TS 24.008.

PLMN: an abbreviation of a public land mobile network and means the network identification number of a provider. In the roaming situation of a UE, a PLMN is divided into a home PLMN (HPLMN) and a visited PLMN (VPLMN).

Meanwhile, when a UE supports dual connectivity (DC), a master eNodeB (MeNB) may not know a timing difference between the MeNB and a secondary eNodeB (SeNB) before a UE reports a system frame number (SFN) and a subframe timing difference (SSTD) to the MeNB. In this case, there is a problem that the UE cannot set a measurement gap offset (MGO) and a synchronization signal burst set timing offset (SSBO) and thus cannot detect a synchronization signal for accessing other cells.

Accordingly, the present description proposes a method by which a UE can detect a synchronization signal in such a case.

<Disclosure of Present Description>

Figure 7:
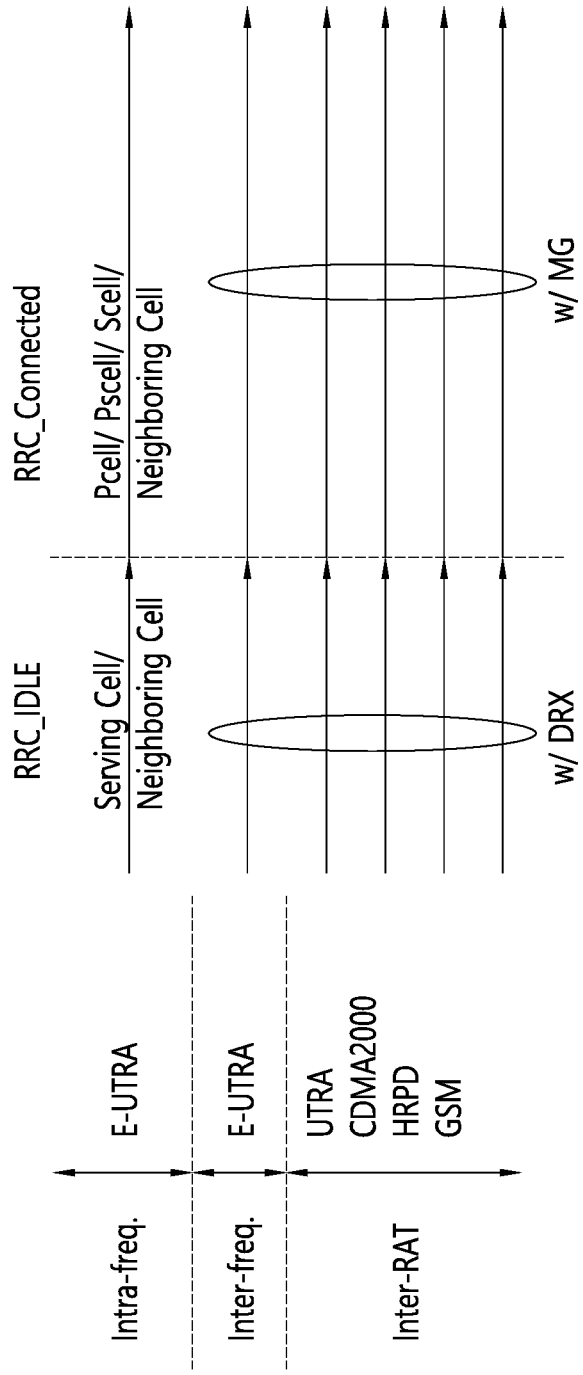
FIG. 7 illustrates measurement in LTE.

FIG. 7 illustrates measurement in LTE.

Referring to FIG. 7, a UE may perform measurement for cell selection and cell re-selection in RRC_IDLE procedure. In RRC_Connected procedure, the UE may perform measurement for handover decision and Scell add-decision by E-UTRAN. Measurement for inter-radio access technology (RAT) can be performed only in cell re-selection in RRC_IDLE procedure and handover in RRC_Connected procedure. Further, the UE may request a measurement gap (MG) for identifying and measuring inter-frequency cells and/or inter-RAT cells in RRC_Connected procedure.

Figure 8:
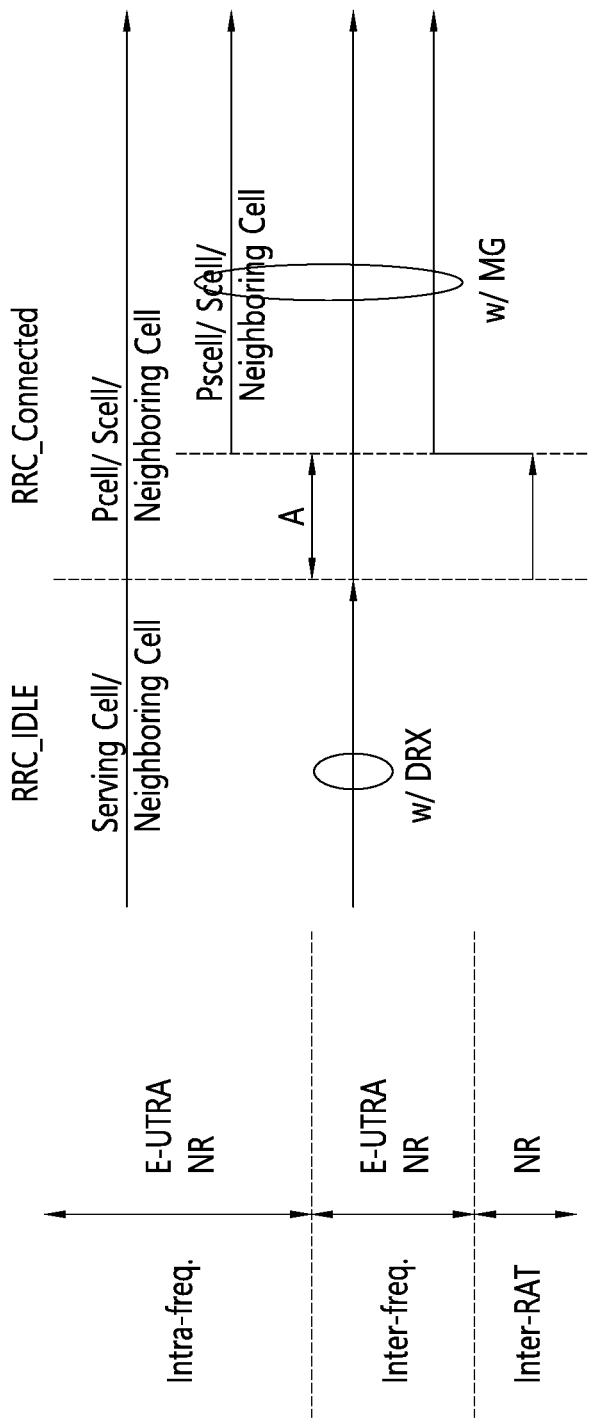
FIG. 8 illustrates measurement in new radio (NR) non-standalone (NSA).

FIG. 8 illustrates measurement in new radio (NR) non-standalone (NSA).

Referring to FIG. 8, in RRC_IDLE procedure, a UE may perform intra-frequency measurement and inter-frequency measurement. Further, since cell re-selection to NR does not occur in E-UTRA, the UE may not perform inter-RAT (NR) measurement in RRC_IDLE procedure. When a serving cell (Pcell) is identified, the UE may signal information about NR, such as a synchronization signal burst set periodicity (SSBP) and an SS burst set timing offset (SSBO) in RRC_Connected procedure and perform inter-RAT measurement at an NR frequency for an interval "A" illustrated in FIG. 8.

If the UE has a single RF chain, the UE may request a measurement gap for performing inter-RAT NR measurement. If the UE includes multiple RF chains, the UE may not request the measurement gap. After the Pcell is activated as a serving cell, the UE may perform intra-frequency measurement as well as inter-frequency measurement for both E-UTRA and NR.

Here, the UE may request a measurement gap in which an E-UTRA inter-frequency is identified and measured according to RF retuning. And/or the UE may request a measurement gap in which an NR intra-frequency is identified and measured according to Rx beamforming. And/or the UE may request a measurement gap in which an NR inter-frequency is identified and measured according to RF retuning. The measurement gaps may be set along with a measurement gap repetition period (MGRP) and a measurement gap offset (MGO).

Figure 9:
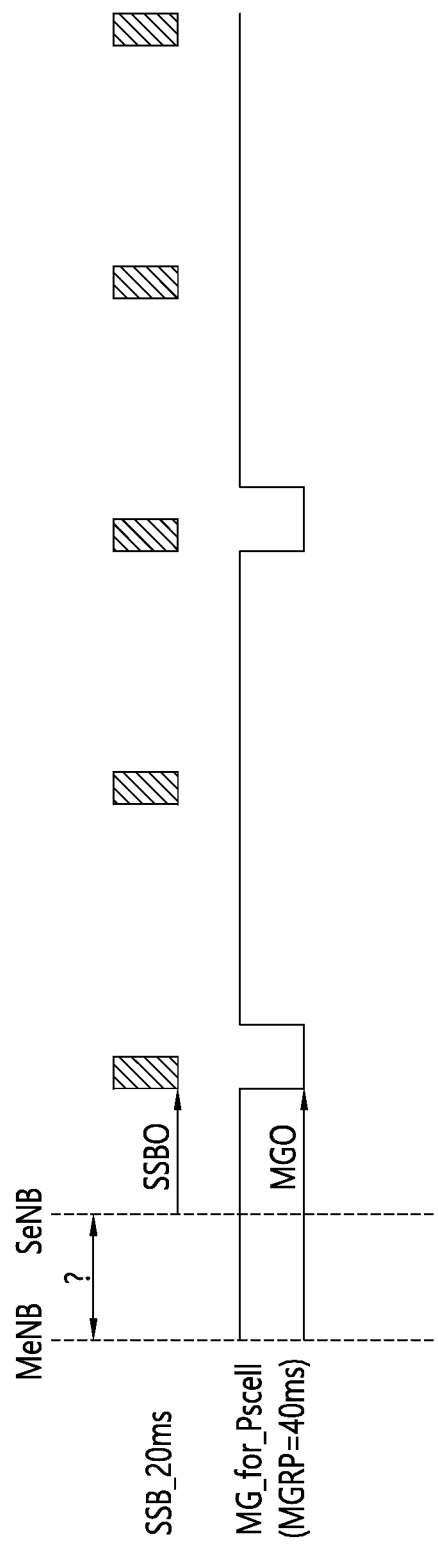
FIG. 9 illustrates a timing difference between an MGO and an SSBO.

FIG. 9 illustrates a timing difference between an MGO and an SSBO.

Referring to FIG. 9, the MGO may be referenced to a master eNB (MeNB) and the SSBO may be referenced to a secondary eNB (SeNB).

As in the following observation, in the case of dual connectivity (DC), the MeNB may not know a timing difference between the MeNB and the SeNB before a report of a system frame number (SFN) and a subframe timing difference (S STD) is received from the UE. The MGO and the SSBO may not be set such that a measurement gap length (MGL) includes SS blocks of a 5 ms window.

Observation: In DC, the MGO is referenced to the MeNB and the SSBO is referenced to the SeNB, and thus the MeNB does not know a timing difference between the MeNB and the SeNB. Here, it may be difficult to set the MGO and the SSBO such that the measurement gap length (MGL) includes SS blocks of a 5 ms window.

To solve this, the present description proposes cases in which the MeNB becomes a reference time of an MGO for the PScell through FIGS. 12 and 13 which will be described later and cases in which the SeNB becomes a reference time of an MGO for the PS cell through FIGS. 14 and 15 which will be described later as a solution.

With respect to a measurement gap, the following requirements are stated in 3GPP TS 36.133 (Rel-14).

- If a UE requests a measurement gap in which inter-frequency cells and/or inter-RAT cells are identified and measured and the UE does not support perServingCellMeasursementGap-r14 or is not configured to have a measurement gap per serving cell, E-UTRAN needs to provide a single measurement gap pattern having a specific gap period for simultaneous monitoring of all frequency layers and RATs.
- If a UE requests a measurement gap in which inter-frequency cells and/or inter-RAT cells are identified and measured and the UE supports perServingCell-MeasursementGap-r14 and is configured to have a measurement gap per serving cell, E-UTRAN needs to provide a gap pattern per serving component carrier when the UE displays necessity of a gap in perCC-ListGapIndication IE.

Whether such a measurement gap pattern is executable by an NR NSA scenario needs to be considered. The NR NSA scenario is based on dual connectivity. In dual connectivity, the MeNB and the SeNB are not regarded as being synchronized, distinguished from carrier aggregation (CA).

When a UE includes multiple RF chains for efficiency in serving cell scheduling and measurement, a method of setting a measurement gap per carrier component (CC) is proposed.

In LTE, the MeNB notifies a UE of an SFN offset between the MeNB and the SeNB through a master information block (MIB) or signaling to the UE, and the UE measures and reports an SSTD between the MeNB and the SeNB.

Figure 10A:
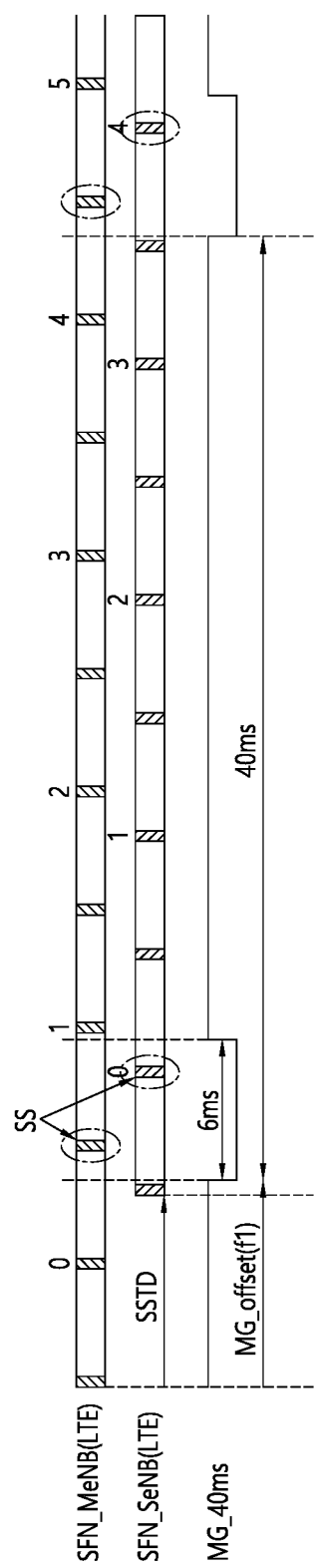
FIG. 10a illustrates an example of a single measurement gap (MG) in LTE dual connectivity.
Figure 10B:
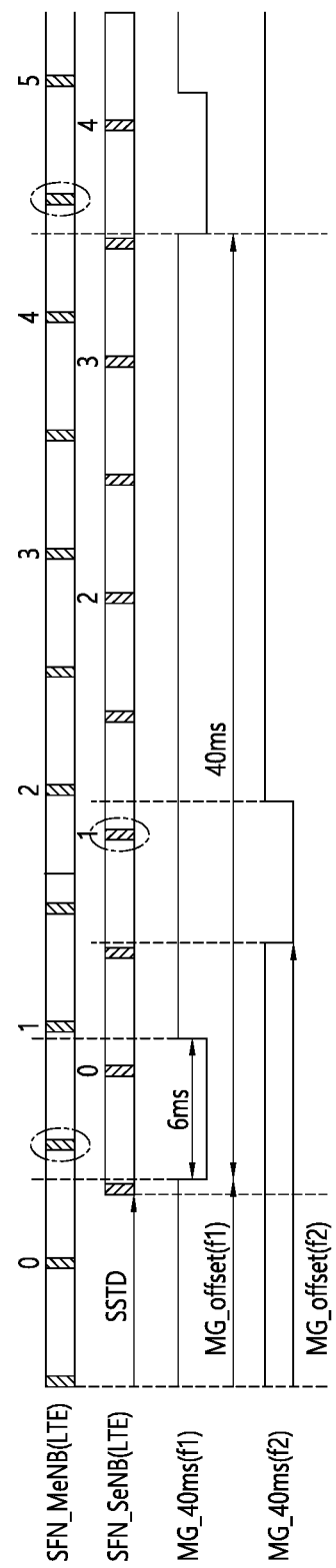
FIG. 10b illustrates an example of per-CC based MG in LTE dual connectivity.

FIG. 10a illustrates an example of a single measurement gap (MG) in LTE dual connectivity and FIG. 10b illustrates an example of per-CC based MG in LTE dual connectivity.

Referring to FIG. 10a, in the case of a single measurement gap, synchronization signals of an MeNB cell and an SeNB cell are located within an MGL window. Referring to FIG. 10b, in the case of per-CC based MG, synchronization signals of the MeNB cell and the SeNB cell are respectively located within respective MGL windows. Here, the MeNB may be a timing reference of measurement gap offsets (MGO) for both the single MG and per-CC based MG.

As illustrated in FIG. 7, when a UE has a single RF chain in an NR NSA scenario, the UE may be expected to request an MG in which inter-RAT NR measurement is performed before PScell activation. Here, PScell activation may refer to the interval "A" illustrated in FIG. 8. In this case, the MGL window may overlap with an SS burst set duration (SSBD) of 5 ms in order to identify and measure inter-RAT cells by the Pcell. Further, the UE need to be notified of SS burst set periodicity (SSBP) and an SS burst set timing offset (SSBO) by the Pcell. For overlap of the MGL window and the SSBD, the notified SSBO needs to be referenced to the MeNB.

Figure 11A:
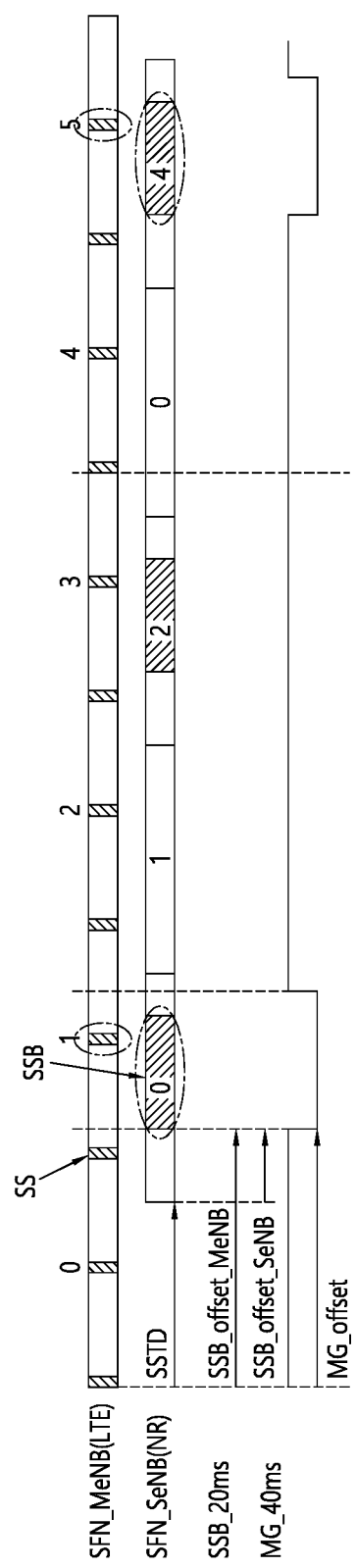
FIG. 11a illustrates an example of a single MG in NR NSA.
Figure 11B:
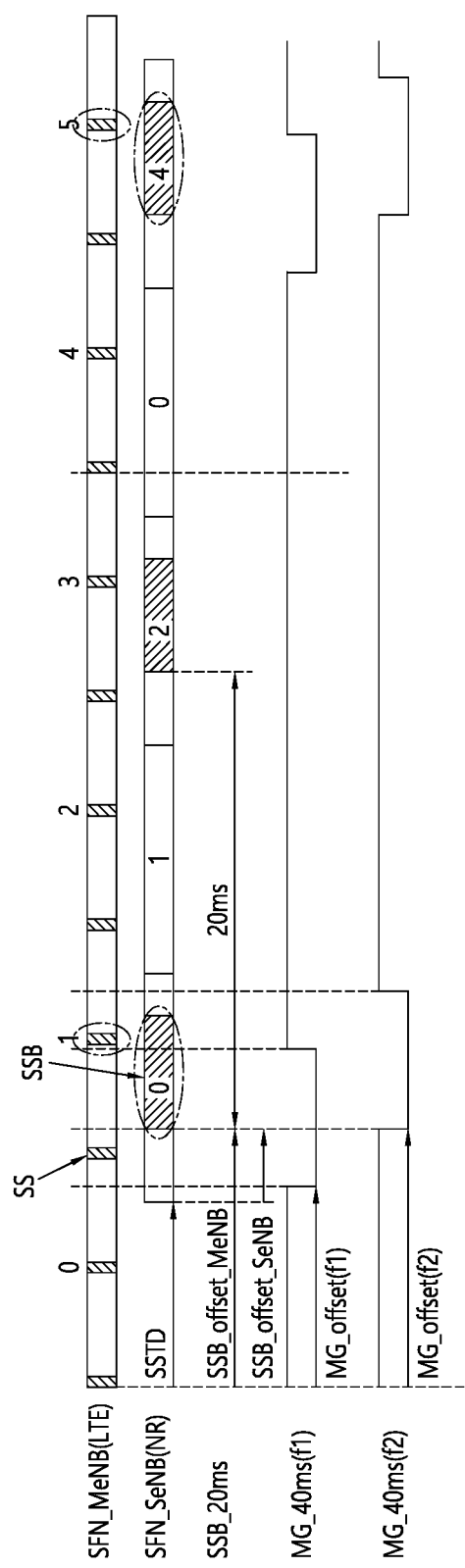
FIG. 11b illustrates per-CC based MG in NR NSA.

FIG. 11a illustrates an example of a single MG in NR NSA and FIG. 11b illustrates an example of per-CC based MG in NR NSA.

Referring to FIG. 11a, in the case of a single NG, a synchronization signal of the MeNB and an SS burst (SSB) of the SeNB need to be located within an MGL window.

Referring to FIG. 11b, in the case of per-CC based MG, the SSB of the SeNB needs to be located within an MGL window configured for SeNB frequency measurement. This can be achieved by setting an MGO and an SSBO by the MeNB for both the single MG and per-CC based MG. Here, the MeNB is a timing reference of the MGO for both the single MG and per-CC based MG.

I. Proposal 1

A timing reference of an SSBO is the SeNB instead of the MeNB, and thus there is a problem that the MeNB cannot recognize the SSBO with respect to the timing reference of the MeNB when the MeNB does not know information about a time difference between the MeNB and the SeNB. Accordingly, a method by which the MeNB becomes a reference time of an MGO for the PScell is proposed in Proposal 1.

For a confiscation for overlapping windows of an MGL and an SSBD, information about a time difference between the MeNB and the SeNB is required. Here, the time difference may be information included in an SSTD reported from a UE.

According to this, the MGO and SSBO may be set as follows according to whether the SSTD has been reported to the MeNB.

(1) Before the UE Reports the SSTD
SSBO=SSBO_SeNB
MGO=MGO_MeNB
(2) After the UE Reports the SSTD
SSBO=SSBO_MeNB=SSBO_SeNB+SSTD
MGO=MGO_MeNB That is, overlapping of the windows of the MGL and the SSBD cannot be set before the UE reports the SSTD. Accordingly, inter-RAT (NR) cells need to be identified and measured in a new MG before the SSTD is reported. Here, "before reporting of the SSTD" may refer to the interval "A" in FIG. 8. After the UE reports the SSTD, a normal MG may be reset.

In the case of a new MG, an SSBP needs to be considered. When it is assumed that different SSBPs are set for inter-RAT NR cells, for example, a maximum SSB may be set to an MGL in order to identify and measure the inter-RAT NR cells.

Figure 12:
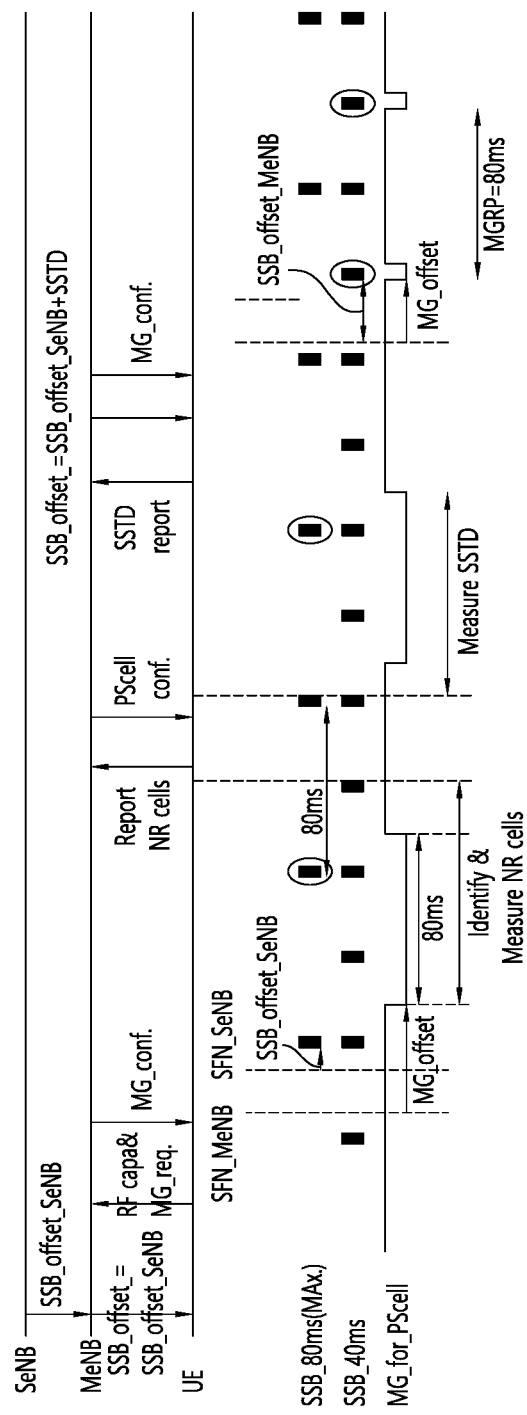
FIG. 12 illustrates a measurement gap when a UE includes a single RF chain in DC of NR.

FIG. 12 illustrates a measurement gap when a UE includes a single RF chain in dual connectivity (DC) of NR.

Referring to FIG. 12, when a UE has a single RF chain in dual connectivity (DC) of NR (e.g., a Pcell is an LTE or NR cell and a PScell is an NR cell), the UE may report the RF capability thereof to the MeNB and send a request for an MG to the MeNB. The MeNB may set an SSBO referenced to the SeNB (SSBO_SeNB) and set an MG in which a maximum SSBP from among SSBPs configured for an NR Pcell is set to an MGL, and MGRP may be set to N*MGL (here, N may be an integer equal to or greater than 1).

The UE can identify and measure NR cells using the MG. Further, after the UE reports measurement of the NR cells to the MeNB, the MeNB may set a PS cell for the UE. Then, the UE measures an SSTD and additionally reports the SSTD to the MeNB. The MeNB can reset SSBO (SSBO_MeNB=SSBO_SeNB+SSTD) referenced to the MeNB and an MG having a general 6 ms MGL and an MGO overlapping MGL and SSBD windows through the reported SSTD.

Before PScell activation, the MGL may be a largest SSBP value from among SSBP values signaled by the MeNB to the UE. Here, "before PScell activation" may refer to "before the UE reports the SSTD to the MeNB"

In addition, the MGL may be set to be equal to or greater than 6 ms after the UE reports the SSTD to the MeNB.

Figure 13:
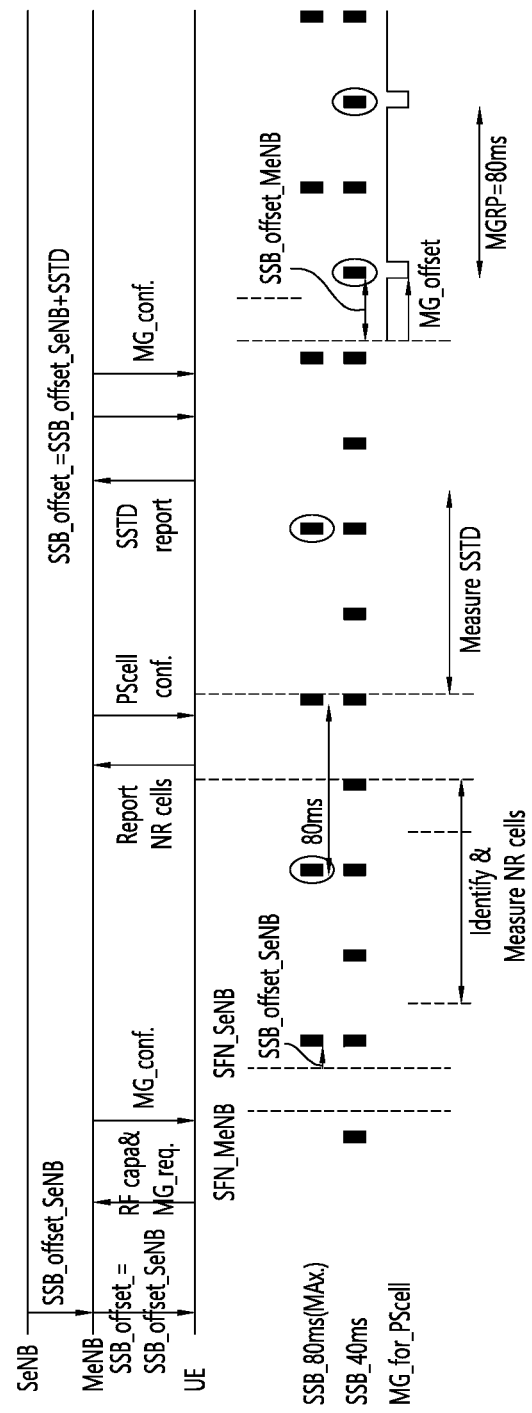
FIG. 13 illustrates a measurement gap when a UE includes multiple RF chains in DC of NR.

FIG. 13 illustrates a measurement gap when a UE includes multiple RF chains in duel connectivity (DC) of NR.

Referring to FIG. 13, the UE reports the RF capability thereof to the MeNB without requesting an MG, distinguished from FIG. 12. The MeNB can set an SSBO (SSB_offset_SeNB) referenced to the SeNB. When there is no MG, the UE can identify and measure NR cells. Further, after the UE reports measurement of the NR cells to the MeNB, the MeNB can set a PScell for the UE. Then, the UE can measure an SSTD and additionally report the measured SSTD to the MeNB.

For inter-NR frequency measurement through RF chains with the PScell, the UE may send a request for an MG to the MeNB. Then, the MeNB may reset SSBO (SSBO_MeNB=SSBO_SeNB+SSTD) referenced to the MeNB and an MG having a general 6 ms MGL and an MGO overlapping MGL and SSBD windows using the reported SSTD.

When the PScell switches to another NR at a different frequency after the PScell is activated as a serving cell and the serving PScell is not synchronized with a target cell, a problem that the MeNB does not know a time difference between the PScell and the target cell is generated and thus the MeNB may not set such that MGL and the SSBD windows overlap.

In a situation in which the PScell has changed to another target cell after PScell activation and the MeNB does not know a time synchronization difference between the PScell and the other target cell, the MGL may be a largest SSBP value from among SSBP values signaled by the MeNB to the UE before the PScell changes to the other target cell and the UE reports the SSTD with respect to the changed PScell to the MeNB. Here, "before the UE reports the SSTD to the MeNB" may refer to "before the MeNB knows the SSTD with respect to the changed PScell".

Before an SSTD between the target cell for the PScell and the Pcell is reported, problems can be solved in consideration of the same approach as that described in FIG. 13. When the MGO is referenced to the MeNB, the SSBO is referenced to the SeNB, and the MeNB does not know a time difference between the MeNB and the SeNB, the MGL may be set to be longer than 6 ms.

Furthermore, the MGL may be set to 6 ms after the UE reports the SSTD to the MeNB. This is because it is inefficient to set the MGL to be equal to or longer than 6 ms even after the UE reports the SSTD to the MeNB with respect to scheduling.

II. Proposal 2

As described above, the timing reference of SSBO is the SeNB instead of the MeNB and thus there is a problem that the MeNB does not recognize the SSBO for the timing reference of the MeNB under the condition that there is no information about a time difference between the MeNB and the SeNB.

Accordingly, proposal 2 proposes a method by which the SeNB becomes the reference time of MGO for the PScell.

To overlap MGL and SSBD windows, a method of setting a timing reference of MGO independently of the corresponding MeNB or SeNB is provided as a simpler method. For example, a timing reference of MGO for the Pcell may be set to the MeNB and a timing reference of MGO for the PScell may be set to the SeNB, which are different from the current specifications in which the MeNB is a common timing reference for both the Pcell and the PScell.

Accordingly, MGO and SSBO can be set as follows according to whether SSTD has been reported to the MeNB.

Figure 14:
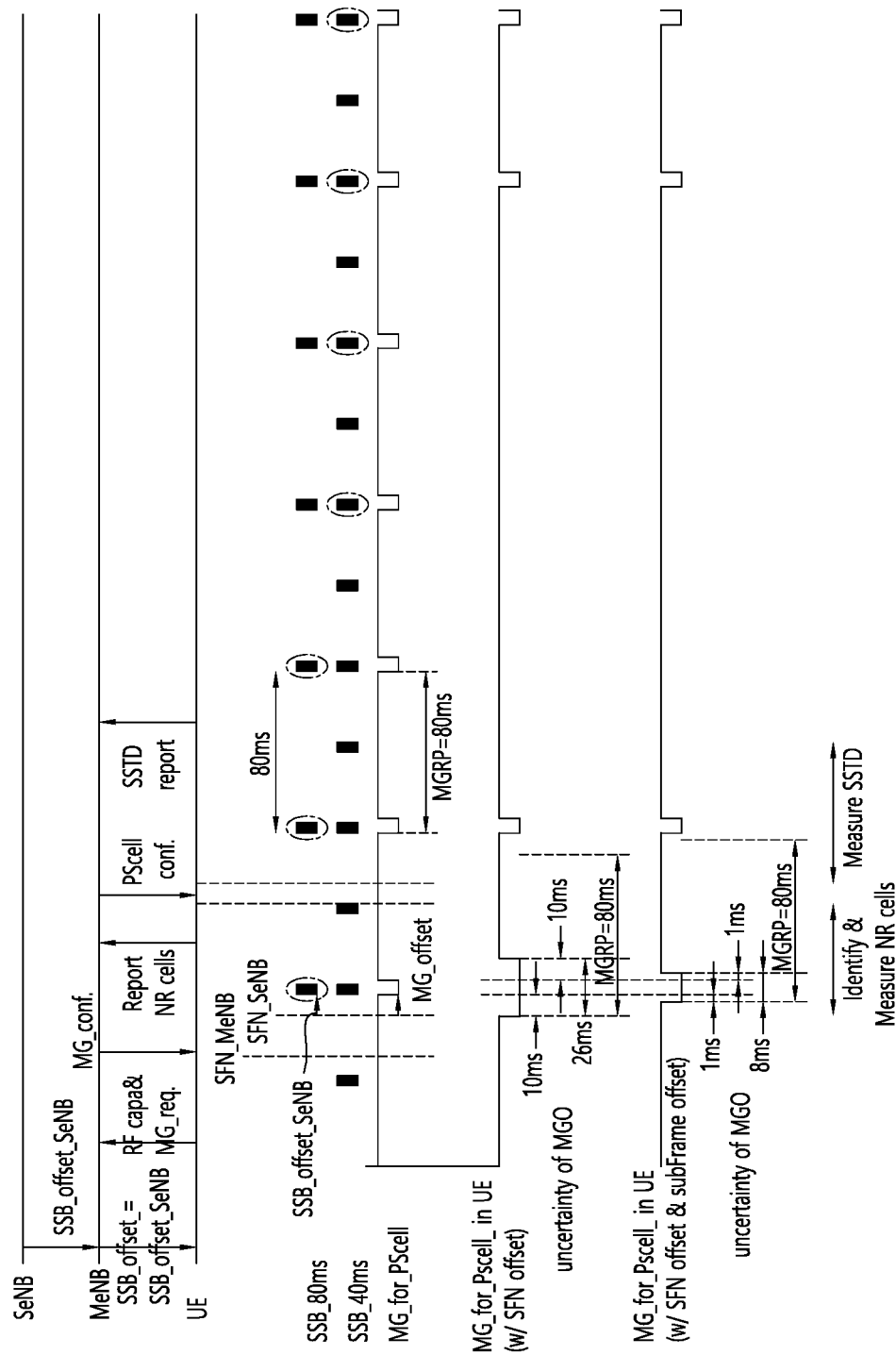
FIG. 14 illustrates timing references for an MGO of a PScell in a single RF chain.

(1) Before the UE Reports the SSTD
SSBO=SSBO_SeNB
MGO_Pcell=MGO_MeNB
MGO_PScell=MGO_SeNB
(2) After the UE Reports the SSTD
SSBO=SSBO_SeNB
MGO_Pcell=MGO_MeNB
MGO_PScell=MGO_SeNB FIG. 14 illustrates a timing reference for MGO of the PScell in a single RF chain.

Referring to FIG. 14, when a UE has a single RF chain in DC of NR (for example, the Pcell is an LTE or NR cell and the PScell is an NR cell), the UE may report RF capability thereof to the MeNB and send a request for an MG to the MeNB. The MeNB may set an SSBO and an MG referenced to the SeNB for overlap of MGL and SSBD.

However, there is a problem that the UE does not know an SeNB reference timing for SSBO and MGO with respect to the SeNB before identification of the PScell, except an MIB received from the Pcell (MeNB) or an SFN offset notified of through signaling. The MGO can deviate from the UE by a maximum of ±10 ms on the basis of the SNF offset. According to uncertainty of the MGO, the UE can identify and measure NR cells using an MGL having a length of 26 ms (10 ms+6 ms+10 ms) irrespective of configuration of an MGL having a length of 6 ms.

To reduce the uncertainty of the MGO, the UE needs to be notified of a subframe offset in addition to the SFN offset. The UE can reduce an off-range of the MGO to ±1 ms using information about the SFN offset and subframe offset between the MeNB and the SeNB and the UE side can use an MGL having a length of 8 ms (1 ms+6 ms+1 ms). The UE can identify and measure NR cells using an MG.

In addition, after measurement of NR cells is reported to the MeNB, the MeNB can set a PScell for the UE and the UE can measure an SSTD and report the SSTD to the MeNB. After identification of NR cells, the UE can use an MGL having a length of 6 ms because the uncertainty of the MGO disappears. Accordingly, the MGO can be determined as follows according to whether NR cells have been identified.

(1) Before Identification of NR Cells
MGO_PScell in UE side=MGO_SeNB±uncertainty of MGO
(2) After Identification of NR Cells
MGO_PScell in UE side=MGO_SeNB In DC, the UE can add MGO uncertainty (MGOU) to the set MGL and perform measurement before identification of an NR cell corresponding to the PScell.

Before NR identification: effective MGL=MGL+MGOU

However, after the UE identifies an NR cell, the MGOU is not considered because the MGOU is meaningless.

After NR identification: Effective MGL=MGL

Here, the MGOU may be as follows according to information about a time difference between the MeNB and the SeNB which is signaled to the UE by the MeNB.

Figure 15:
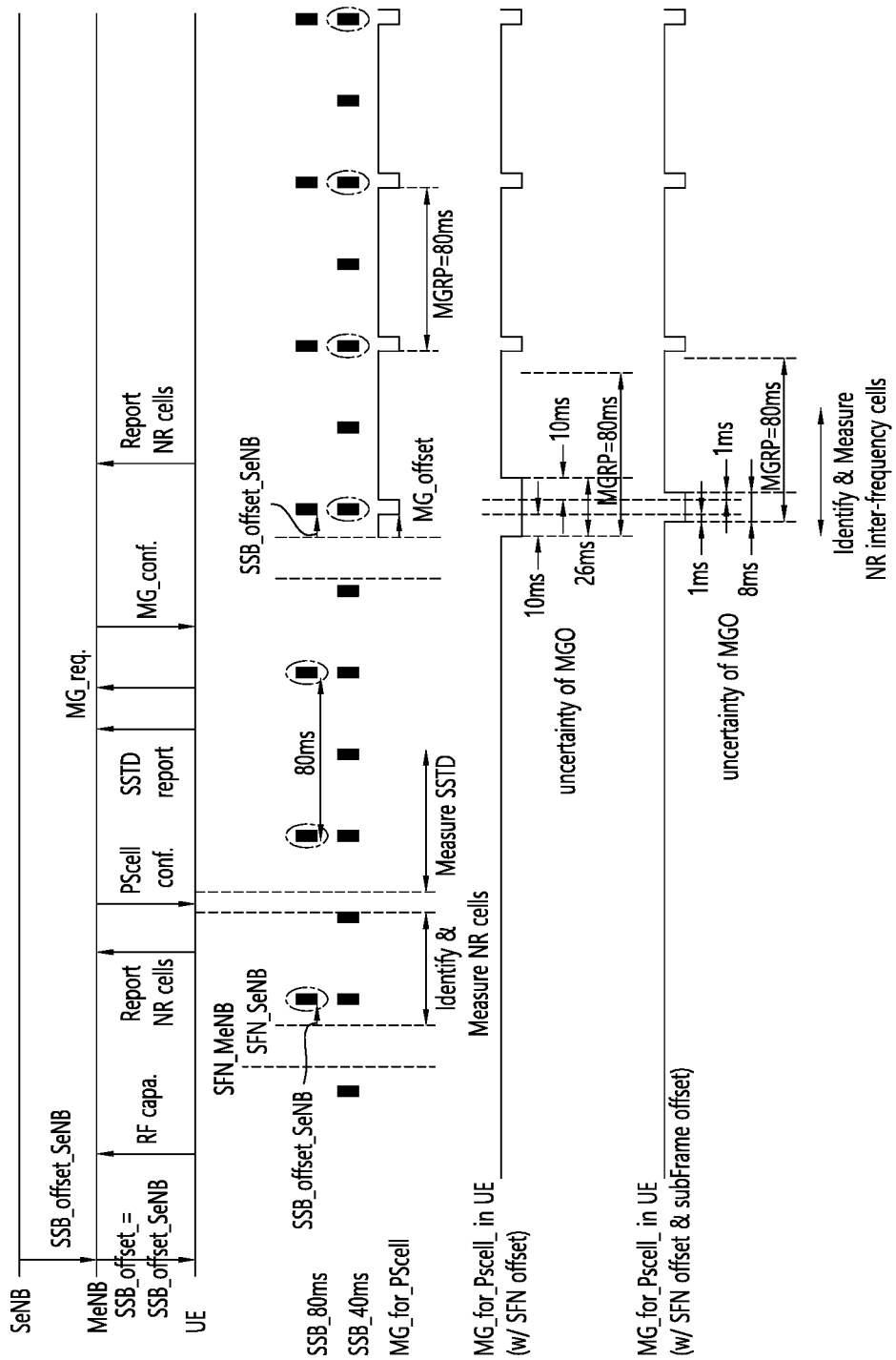
FIG. 15 illustrates timing references for an MGO of a PScell in multiple RF chains.

(1) When the MeNB Provides Only the SFN Offset to the UE
 MGOU=±10 ms
 Effective MGL=left-side MGOU+MGL+right-side MGOU=10 ms+6 ms+10 ms=26 ms
(2) When the MeNB Provides the SFN Offset and the Subframe Offset to the UE
 MGOU=±1 ms
 Effective MGL=left-side MGOU+MGL+right-side MGOU=1 ms+6 ms+1 ms=8 ms FIG. 15 illustrates timing references for an MGO of a PScell in multiple RF chains.

Referring to FIG. 15, when a UE has multiple RR chains in DC of NR (for example, a Pcell is an LTE or NR cell and a PScell is an NR cell), the UE can report RF capability thereof to the MeNB. In addition, after measurement of NR cells is reported to the MeNB, the MeNB can set a PScell for the UE and the UE can measure an S STD and report the SSTD to the MeNB. In inter-NR frequency measurement in an RF chain of the PS cell, the UE can send a request for an MG to the MeNB. Then, the MeNB can set the MG with reference to another SeNB corresponding to an NR inter-frequency at which MGL and SSBD window overlap.

However, there is a problem that the UE does not know a reference timing of the other SeNB with respect to SSBO and MGO before identification of an inter-NR frequency cell, except an MIB received from the Pcell (MeNB) or an SFN offset notified of through signaling. The MGO can deviate from the UE by a maximum of ±10 ms on the basis of the SNF offset. According to uncertainty of the MGO, the UE can identify and measure NR cells using an MGL having a length of 26 ms (10 ms+6 ms+10 ms) irrespective of configuration of an MGL having a length of 6 ms.

To reduce the uncertainty of the MGO, the UE needs to be notified of a subframe offset in addition to the SFN offset. The UE can reduce an off-range of the MGO to ±1 ms using information about the SFN offset and subframe offset between the MeNB and the SeNB and the UE side can use an MGL having a length of 8 ms (1 ms+6 ms+1 ms).

The UE can identify and measure inter-NR frequency cells using an MG. In addition, after the UE reports measurement of inter-NR frequency cells to the MeNB, the MeNB can reset the PScell for the UE and the UE can measure an S STD and report the SSTD to the MeNB. After identification of inter-NR frequency cells, the UE can use an MGL having a length of 6 ms because the uncertainty of the MGO disappears. Accordingly, the MGO can be determined as follows according to whether NR cells have been identified (1) Before Identification of Inter-NR Frequency Cells
 MGO_PScell in UE side=MGO_SeNB±uncertainty of MGO
(2) After Identification of Inter-NR Frequency Cells
 MGO_PScell in UE side=MGO_SeNB When the MGO is referenced to the SeNB, the SSBO is referenced to the SeNB, and the MeNB does not know a timing difference between the MeNB and the SeNB, the MeNB needs to notify the UE of a subframe offset in addition to an SFN offset in order to reduce the uncertainty of the MGO on the UE side.

In DC, the UE can add MGO uncertainty (MGOU) to the set MGL and perform measurement before an NR PScell changes to another target cell after the NR PScell is activated and the target cell is identified.

Before NR identification: effective MGL=MGL+MGOU
 However, after the UE identifies an NR cell, the MGOU is not considered because the MGOU is meaningless.

After NR identification: Effective MGL=MGL
 Here, the MGOU may be as follows according to information about a time synchronization difference between the MeNB and the SeNB which is signaled to the UE by the MeNB.

(1) When the MeNB Provides Only the SFN Offset to the UE
 MGOU=±10 ms
 Effective MGL=left-side MGOU+MGL+right-side MGOU=10 ms+6 ms+10 ms=26 ms
(2) When the MeNB Provides the SNF Offset and the Subframe Offset to the UE
 MGOU=±1 ms
 Effective MGL=left-side MGOU+MGL+right-side MGOU=1 ms+6 ms+1 ms=8 ms The above description can be implemented by hardware.

Figure 16:
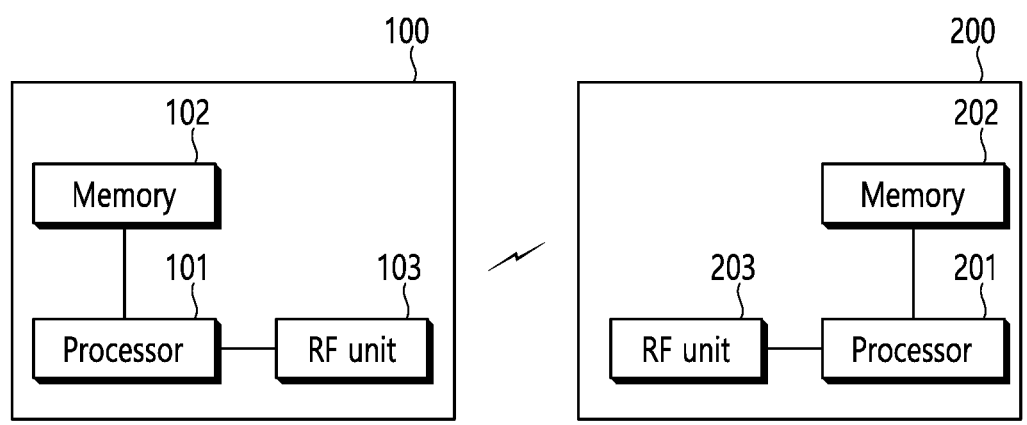
FIG. 16 illustrates a wireless communication system in which embodiments proposed in the present description are realized.

FIG. 16 is a block diagram showing a wireless communication system in which embodiments proposed in the present description are realized.

An eNB 200 includes a processor 201, a memory 202 and a radio frequency (RF) unit 203. The memory 202 is connected to the processor 201 and stores various types of information for driving the processor 201. The RF unit 203 is connected to the processor 201 and transmit and/or receives RF signals. The processor 201 implements the proposed functions, processes and/or methods. In the above-described embodiments, operations of the eNB can be implemented by the processor 201.

A wireless device 100 includes a processor 101, a memory 102 and an RF unit 103. The memory 102 is connected to the processor 101 and stores various types of information for driving the processor 101. The RF unit 103 is connected to the processor 101 and transmit and/or receives RF signals. The processor 101 implements the proposed functions, processes and/or methods. In the above-described embodiments, operations of the wireless device can be implemented by the processor 101.

The processors may include application-specific integrated circuits (ASICs), other chipsets, logic circuits and/or data processors. The memories may include a read-only memory (ROM), a random access memory (RAM), a flash memory, a memory card, a storage medium and/or other storage units. The RF units may include a baseband circuit for processing RF signals. When an embodiment is implemented by software, the above-described methods may be implemented as modules (e.g., processors and functions) which execute the above-described functions. The modules may be stored in the memories and executed by the processors. The memories may be positioned inside or outside the processors and connected to the processors through known means.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method of performing measurement by a user equipment (UE) supporting dual connectivity for a first radio access technology (RAT) and a second RAT, the method comprising:

receiving configuration information related to an inter-RAT measurement including information about a synchronization signal block of a second cell of the second RAT, from a first cell of the first RAT;

obtaining, by the UE in a radio resource control (RRC) connected state, a time difference between a timing of the first cell and a timing of the second cell based on the configuration information; and transmitting information including the time difference to the first cell.

2. The method of claim 1, wherein, based on the UE being configured with a measurement gap, the time difference is obtained based on the measurement gap.

3. The method of claim 2, wherein the measurement gap includes at least one synchronization signal block of the second cell.

4. The method of claim 1, wherein the time difference is obtained without being configured with a measurement gap.

5. The method of claim 1, further comprising:

receiving, from the first cell, reconfiguration information related to the inter-RAT measurement; and setting, based on the reconfiguration information, a measurement gap including at least one synchronization signal block of the second cell.

6. The method of claim 1, wherein the first RAT is an Evolved- Universal Mobile Telecommunications System Terrestrial Radio Access (E-UTRA), and the second RAT is a New Radio (NR).

7. A user equipment (UE) performing measurement, the UE comprising:

a transceiver; and a processor for controlling the transceiver, wherein the UE supports dual connectivity for a first radio access technology (RAT) and a second RAT, wherein the processor is configured:

to control the transceiver to receive configuration information related to an inter-RAT measurement including information about a synchronization signal block of a second cell of the second RAT, from a first cell of the first RAT;

to obtain, in a radio resource control (RRC) connected state, a time difference between a timing of the first cell and a timing of the second cell based on the configuration information; and to transmit information including the time difference to the first cell.

8. The UE of claim 7, wherein, based on the UE being configured with a measurement gap, the time difference is obtained based on the measurement gap.

9. The UE of claim 8, wherein the measurement gap includes at least one synchronization signal block of the second cell.

10. The UE of claim 7, wherein the time difference is obtained without being configured with a measurement gap.

11. The UE of claim 7, wherein the processor is further configured to:

receive, from the first cell, reconfiguration information related to the inter-RAT measurement; and set, based on the reconfiguration information, a measurement gap including at least one synchronization signal block of the second cell.

12. The UE of claim 7, wherein the first RAT is an Evolved- Universal Mobile Telecommunications System Terrestrial Radio Access (E-UTRA) and the second RAT is a New Radio (NR).

* * * * *